Feb. 10, 1942.  W. E. DEAN  2,272,292
PLANTING DEVICE
Filed Nov. 30, 1936  2 Sheets-Sheet 1

INVENTOR.
WILLIAM E. DEAN
BY
ATTORNEY.

Feb. 10, 1942. W. E. DEAN 2,272,292
PLANTING DEVICE
Filed Nov. 30, 1936 2 Sheets-Sheet 2
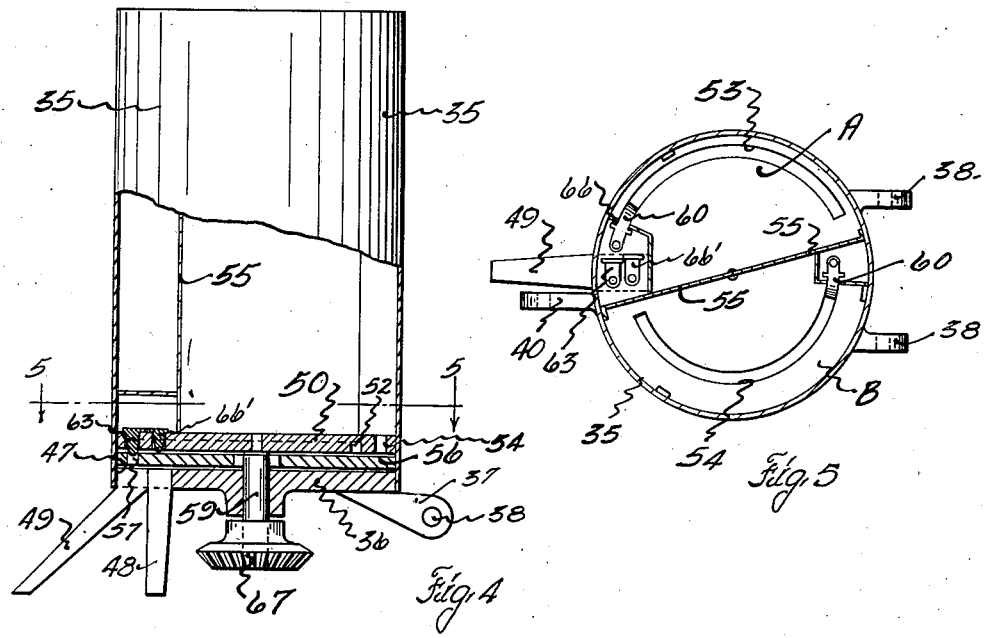
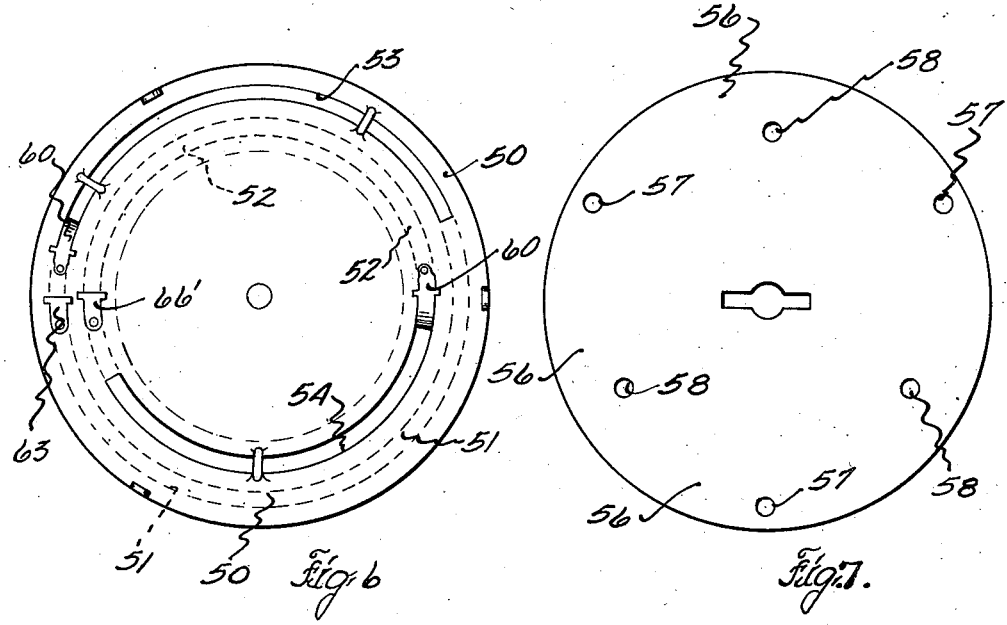
INVENTOR.
WILLIAM E. DEAN
BY
ATTORNEY.

Patented Feb. 10, 1942

2,272,292

UNITED STATES PATENT OFFICE 2,272,292

PLANTING DEVICE

William E. Dean, Portland, Ark.

Application November 30, 1936, Serial No. 113,288

2 Claims. (Cl. 111—73)

This invention relates to new and useful improvements in planting devices.

One object of the invention is to provide an improved device for effectively planting any kind of seed.

An important object of the invention is to provide an improved planter which is so constructed that more than one species or varieties of seed may be planted in the same furrow at the same time, whereby the necessity of passing the planting device over the same ground twice is eliminated.

Another object of the invention is to provide an improved planter which is so arranged that the seed may be planted at different depths in the same furrow.

Still another object of the invention is to provide an improved planter for planting more than one species of seed in the same furrow, that is, corn and beans may be planted at the same time; the device being so arranged that the seed bed, after the planting is, formed so that it will shed water if the weather is extremely wet and will seal in the moisture in dry weather.

Another object of the invention is to provide a combination planting and harrowing device which is provided with a harrow blade, whereby the furrow may be opened just before the seed is planted.

A still further object of the invention is to provide an improved planter for planting more than one species of seed in a single furrow and having means for actuating the planting means, said means being driven by the traction wheel of said planter; there also being improved means for disconnecting the actuating means, whereby the planter may be moved without actuating the planting means.

A construction designed to carry out the invention will be hereinafter described, together with other features of the invention.

Figure 1:
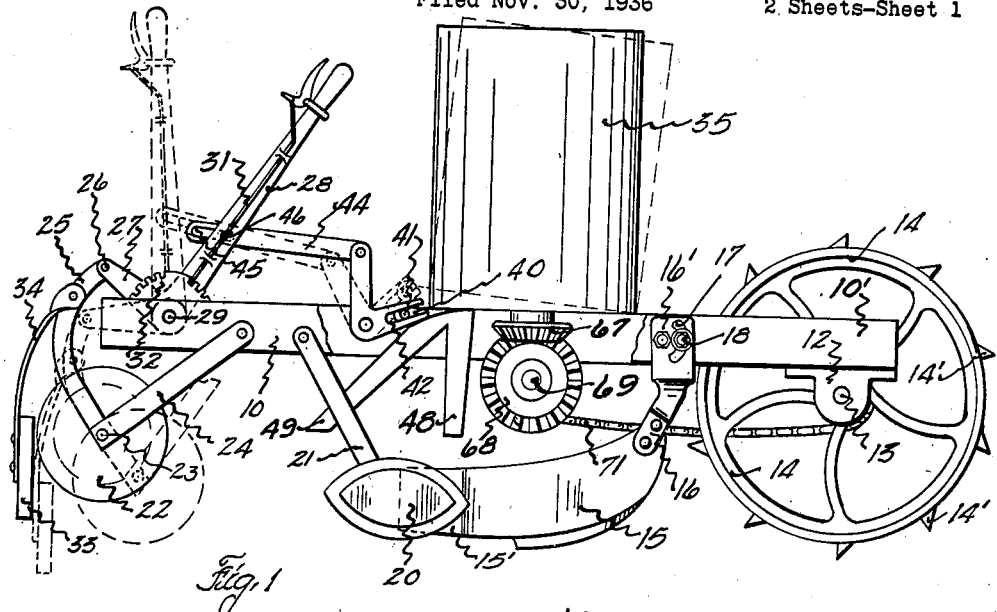
Figure 2:
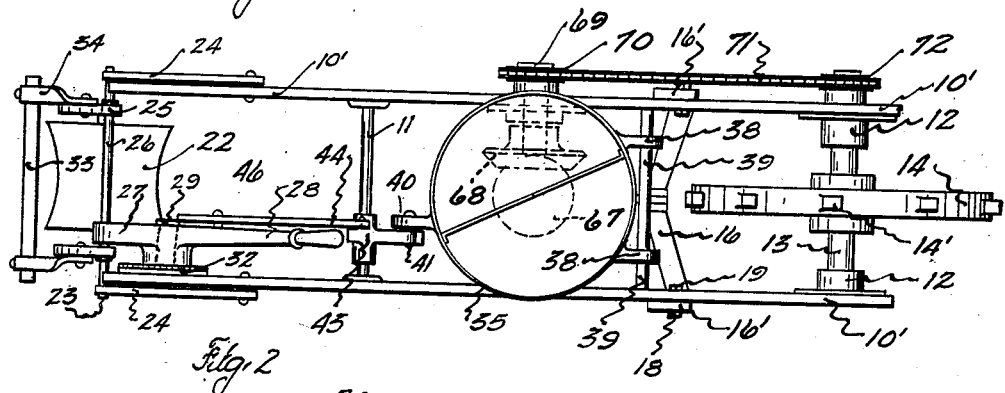
Figure 3:
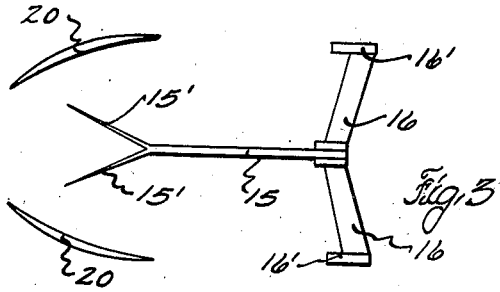

The invention will be more readily understood from a reading of the following specification and by reference to the accompanying drawings, in which an example of the invention is shown, and wherein:

Figure 1 is a side elevation of a planting device, constructed in accordance with the invention, Figure 2 is a plan view of the same, Figure 3 is a diagrammatical view showing the relative position of the furrow opener and the furrow covers, Figure 4 is a view, partly in elevation and partly in section of the seed hopper, Figure 5 is a horizontal, cross-sectional view, taken on the line 5—5 of Figure 4, Figure 6 is a plan view of the cover plate which forms the bottom of the hopper, Figure 7 is a plan view of a distributor plate which is adapted for use in the planting of corn, beans or the like.

In the drawings, the numeral 10 designates a frame which is formed of longitudinally extending frame bars 10' which are suitably connected together and spaced from each other by transverse bracing members 11. The underside of the forward end of each bar is provided with suitable bearing boxes 12, whereby a transverse shaft 13 is mounted or carried at the forward end of the frame. A suitable traction wheel 14 having lugs 14' on its periphery is journaled on the mid-portion of the transverse shaft 13, and since this wheel rides on the ground, it will be obvious that the forward end of the frame is supported thereby.

A curved harrow blade or furrow opener 15 is suspended from the frame being located just behind the traction wheel 14. As is clearly shown in Figures 1 and 3, the blade curves upwardly toward its forward end, which end is riveted or otherwise secured to a transversely extending hanger or yoke 16. The upwardly extending arms 16' of the yoke are provided with arcuate slots 17 through which bolts 18 extend. The bolts 18 also pass through the frame bars 10' and receive nuts 19 on their inner end, whereby the arms of the yoke or hanger member are secured to the frame. It is noted that by loosening the bolts the hanger member may be moved with relation to the frame because of the arcuate slots 17 and therefore, it is possible to obtain an adjustment by raising or lowering the forward end of the blade 15 by means of these slots and the bolts.

The rear end of the blade 15 is provided with flaring wings as shown at 15' whereby after the forward end of the blade opens the furrow, the wings will serve to spread said furrow so as to widen the same. Curved scraper blades 20 are carried by vertical arms 21 which arms have their upper ends secured to the frame 10 of the device. The blades are disposed one on each side of the forked end 15' of the harrow blade and as is clearly shown in Figure 3, are directed inwardly toward their rear ends. Thus as the blade 15 opens the furrow and a seed is dropped between the forked ends 15' of said blade into the furrow, then the curved scraper blade will direct the dirt inwardly so as to cover over the seed and thus close the furrow.

For supporting the rear end of the frame 10 and also for travelling over the closed furrow so as to press or pack the ground after the seed is planted, a presser wheel 22 is provided. This wheel is mounted on a transverse shaft 23 which has its ends extending beyond the side bars 10' of the frame, as is clearly shown in Figure 2. The extreme outer ends of the shaft 23 are secured to the lower end of arms 24, the upper ends of which are pivoted to the frame bars 10'. With this arrangement it will be obvious that the presser wheel may be swung upwardly toward the frame 10. For swinging the presser wheel 22 to various positions, a pair of curved arms 25 have their lower ends fastened to the transverse shaft 23 between the wheel 22 and the supporting bars 24. The upper end of these curved arms or bars are connected by a transverse rod 26, which rod is secured to the outer end of a bell crank 27. The bell crank is formed on the lower end of a hand lever 28 which is pivoted on a stud 29 extending inwardly from one of the frame bars 10'. It will be obvious by swinging the hand lever, the curved arms 25 are raised and lowered which, in turn, raises or lowers the shaft 23 which carries the wheel 22 and, therefore, said wheel will be swung with relation to the frame on its supporting bars 24. To hold the hand lever in various adjusted positions said lever is provided with a spring pressed latch member or rod 31 arranged to engage a segmental or arcuate ratchet 32 which is secured on the frame bars 10'. A transverse scraper blade 33 is located behind the presser wheel 22 and is carried by supporting members 34 which members have their upper ends riveted or otherwise secured to the curved arms 25, whereby the blade 33 will be raised and lowered with said wheel.

From the above, it will be seen that the harrow blade 15 opens the furrow, while the curved scraper blade 20 directs the dirt over the furrow to close the same. The presser wheel then passes over or rides upon the crest of the closed furrow and the scraper blade 33 being located behind said presser wheel will smooth the surface in which the seed has been planted. It is pointed out that when the hand lever 28 is swung to the position shown in dotted lines in Figure 1, the presser wheel 22 is lowered with relation to the frame. As the presser wheel is lowered and engages the ground, it will be seen that the frame 10 will be swung upwardly at its rear end swinging on the shaft 13 at its forward end which acts as a pivot. By lowering the presser wheel sufficiently, it will be seen that the harrow blade 15 and the curved scraper blade 20 may be lifted from the ground, whereby the device may move along the ground without the blades 15 and 20 contacting the same.

For dropping a seed between the forked end 15' of the blade 15 and in front of the cover blade 20 whereby the seed is dropped into the opened furrow, and also for dropping a second seed behind the curved blade 20 and on top of the closed furrow, a suitable seed hopper 35 is provided. This hopper is cylindrical in shape, as is clearly shown in Figures 4 and 5 and has its upper end open while its lower end is closed by a transverse bottom 36. This bottom is provided with forwardly extending lugs 37 which have openings 38 therein, whereby a transverse shaft 39 extending between the frame bars 10' of the frame may pass through said opening (Figure 2). Thus, it will be seen that the hopper is pivotally mounted on the shaft 39. The rear end of the hopper is provided with a similar lug 40 which lug has a pin 41 extending from one side thereof. This pin engages within a slot 42 in one arm of a bell crank lever 43, which lever is pivoted to one of the frame bars 10'. The other arm of the bell crank lever is pivotally connected with one end of an elongate actuating bar 44, and the opposite end of this bar is provided with an elongated slot 45, through which a pin 46 on the hand lever 28 extends. Thus, it will be seen that when the hand lever is swung to raise or lower the pressure wheel 22, as has been explained, the bell crank 43 will be swung through the medium of the actuating bar 44, whereby the rear end of the hopper will be raised or swung on the shaft 39.

The bottom 36 of the hopper (Figure 4) is provided with an opening or slot 47 which is located at the periphery thereof adjacent the lug 40. Extending downwardly from this opening or slot 47 are a pair of chutes 48 and 49, as clearly shown in Figure 1. The chute 48 is substantially vertical and has its lower end located just above the forked end 15' of the blade 15, whereby seed falling through this chute will fall between the forked end forwardly of the curved scraper blade 20. The other chute 49 is inclined rearwardly so that its outlet or lowermost end is located at a point rearwardly of the curved scraper blades 20, whereby seed falling from this chute will drop behind the blades 20 and therefore, onto the closed furrow. By alternately directing the seed first to the chute 48 and then to the chute 49 it will be obvious that one seed will be planted in the bottom of the furrow formed by the blade 15, while the second seed will be planted on top of the furrow which has been closed by the blades 20 and therefore, the two seeds will be planted at different depths in the ground. It is, of course, possible to direct two or three seeds through the chute 48 before one is directed to the chute 49 and therefore, it is obvious that any desired number of seeds may be planted at a given depth while any other desired number of seeds may be planted at a different depth.

For distributing the seed to the chutes 48 and 49, a circular cover plate 50 is located within the hopper 35, being suitably fastened therein. This cover plate, as clearly shown in Figure 4 is spaced from the bottom 36 of the hopper and it will be obvious that seeds dropped into said hopper will fall onto this cover plate. The details of the cover plate 50 are clearly shown in Figure 6. This plate is formed with a pair of circular grooves 51 and 52 in its underside. The grooves are annular and the groove 51 is formed on a greater radius than is the groove 52 whereby the grooves are concentric as is clearly shown in Figure 6. The outer groove 51 has a portion thereof cut completely through the plate to form an arcuate slot 53 which extends entirely through the plate, while a similar arcuate slot 54 is provided in alinement with the groove 52. A transverse partition 55 extends across the hopper within the same and as is clearly shown in Figure 5 separates the slot 53 from the slot 54. Therefore, the hopper is divided into two compartments A and B.

The seed which is entered into the compartment A will drop into the slot 53, while the seed which is entered into the compartment B will fall into the arcuate slot 54. Disposed between the cover plate 50 and the bottom 36 of the hopper is a distributing plate 56. This plate will vary in construction according to the seed which is to be planted and one type of plate is shown in Figure 12. This plate is for planting the seed of corn and beans. As shown in this figure the plate is circular, having substantially the same diameter as the hopper and is provided with a trio of openings 57 which are located near its outer periphery, all of the openings 57 being located on the same radii. A second trio of openings or holes 58 are also formed in the plate and are disposed on a smaller radii than are the openings 57. The openings 57 and 58 are so positioned that the former register with the outer groove 51 and slot 53 in the cover plate, while the latter register with the inner groove 52 and inner slot 54. Therefore, it will be obvious that with the distributing plate 56 in position between the cover plate 50 and the top or bottom 36, the openings 58 being in registration with the slot 54 will receive seeds which have been entered into the compartment B and have fallen into said slot 54. Similarly, seed entered into the compartment A falls into the slot 53 and will thus enter the openings 57 in the distributing plate. The seed which has entered these openings 57 and 58 cannot fall through such openings because of the bottom of the hopper 36 being located contiguous to the underside of the distributing plate 56.

The distributing plate 56 is provided with an axial opening through which a vertical stub shaft 59 extends. The stub shaft is suitably mounted in the bottom 36 of the hopper and is keyed or otherwise fastened to the distributor plate 56, whereby rotation of the shaft will rotate the distributor plate. Therefore, the distributor plate is rotatable within the hopper between the stationary cover plate 50 and the stationary bottom 36 of said hopper.

Assuming the seed for corn to be introduced into the compartment A, while the bean seeds are introduced into the compartment B, it will be seen that the seeds in the respective compartments will fall into the slots 53 and 54. As the distributor plate 56 rotates beneath the cover plate 50 it will be seen that the corn seed in the slot 53 will enter the opening 57 in said distributor plate, while the bean seed in the slot 54 will enter the opening 58 in said plate. As each opening passes from beneath its respective slot, the seed will be scraped off of the cover plate and kept in its compartment by a pivoted scraper blade 60 which is located at each end of the slots 53 and 54.

The action of these blades is obvious for as the seed is carried around through the slot by the distributor plate 56, some of this seed will enter the opening in said distributor plate. The remaining seed will lie on the surface of said plate and will be carried around through the slot and as it strikes the scraper blade 60 this seed will be moved upwardly into the compartment, whereby the seed is prevented from passing into the groove which is in registration with the slot. Therefore, it will be seen that the scraper blade serves to hold the seed in the compartment in which it has been introduced.

The seed which has entered the openings 57 and 58 in the distributor plate will, of course, remain in said openings because said seed cannot fall therethrough because of the bottom 36 of the hopper. Therefore, the seed within the openings will be carried around as the plate 56 rotates. The seed within the opening 57 which are those seeds from the compartment A of the hopper will pass beneath a pivoted dog 63 which dog is mounted in the cover plate 50. The lower end of the dog is rounded and the dog is so located in the plate 50 that the opening 57 in the distributor plate 56 will pass therebeneath as the plate rotates. Thus, it will be seen that the seed which has been trapped in the opening 57 will be carried around by the rotation of the plate 56 until the opening passes beneath the dog 63 at which time said dog enters the opening 57 and forces the seed which is therein downwardly from said opening. Immediately below the dog 63 is the outlet opening or slot 47 in the bottom 36 of the hopper. In this opening is located the upper end of the inclined outlet chute 49 whereby the seed which is forced from the opening 57 in the distributor plate are dropped downwardly into the inclined chute 49. A similar arrangement for ejecting the seed from the inner opening 58 in the distributor plate is provided. A dog 66' similar in every detail to the dog 63 is mounted in the cover plate 50 in alinement with the opening 58. Also disposed in alinement with the opening 58 and mounted in the outlet opening 47 in the bottom 36 of the hopper is the upper end of the vertical chute 48 whereby the seeds which are ejected from the openings 58 by the dog 63 will drop into the vertical chute 48. Thus, it will be seen that as the distributor plate 56 rotates the seed from the separate compartments A and B of the hopper will enter the openings 57 and 58 of said plate and will be deposited or directed to the respective outlet chutes 48 and 49. With this arrangement, the seeds in the compartment B will be ejected from the outlet 48, while the seeds in the compartment A will be ejected from the chute 49.

The distributor plate 56 may be rotated by any suitable means but I prefer to mount a bevelled gear 67 on the lower end of the stub shaft 59. When the hopper 35 is in its lower operating position as shown in Figure 1 full lines, the gear 67 is in engagement with a pinion 68 which pinion is mounted on a shaft 69 carried by one of the side bars 10' of the frame. The outer end of the shaft 69 carries a sprocket wheel 70 over which a drive chain 71 passes. The chain 71 also passes over a sprocket wheel 72 which is mounted on the outer end of the shaft 13 on which the traction wheel 14 is keyed. With this arrangement, it will be seen that as the traction wheel 14 rotates due to the planter being moved forwardly along the ground, the shaft 13 will rotate the sprocket 72 which in turn will rotate the shaft 69 through the medium of the chain 71 and sprocket 70. Rotation of the shaft 69 will, of course, rotate the gear 68 and this gear will, in turn, rotate the shaft 59 by means of the gear 67.

In operation, the hand lever 28 is swung to the position shown in full lines in Figure 1 whereby the presser wheel 22 is lifted from the ground. At this time the scraper blade 33 behind said wheel due to its disposition in a lower horizontal plane than the wheel engages the ground. Also the harrow blade 15 is contacting the ground whereby as the device is moved forwardly said blade opens the furrow. The swinging of the lever 28 to position the parts as described, also swings the hopper 35 downwardly to its operating position as shown in full lines in Figure 1. This is accomplished by means of the actuating bar 44 and the bell crank lever 43. The seed to be planted is then entered into the compartments A and B and for the purposes of description, it will be assumed that the seed in the compartment A is corn, while the seed in the compartment B is beans.

As the device is moved forwardly, it will be seen that the traction wheel 14 will impart a rotation to the distributor plate 56 by means of the chain 71, sprockets 70 and 72 and the gears 68 and 67. As the plate 56 rotates, the seed in each compartment A and B will enter the respective openings 57 and 58 in said plate, whereby said seeds are carried around to a point above the chutes 48 and 49. The dogs 63 and 66 will automatically actuate, as has been described, to force the seeds from the openings 57 and 58 and into the chutes 48 and 49.

The bean seed from the compartment B will be ejected from the opening 58 in the distributor plate into the upper end of the vertical chute 48 and will drop downwardly between the forked end 15' of the blade into the furrow which has been formed by the blade 15. The scraper blades 20 being immediately behind the blade 15 will direct the dirt inwardly to cover the bean seed which has dropped between the forked ends of the blade. The corn seed which is ejected from the compartment A will fall into the inclined chute 49 and will be dropped behind the curved blades 20 whereby it will be planted at a different depth than the seed which has dropped between the forked end of the blade 15. After this seed has been dropped the transverse scraper blade 33 at the extreme rear end of the machine will pass over and smooth the dirt over the seed ejected from the chute 49. The particular time at which the seeds are ejected from the chutes 48 and 49 is dependent upon the position of the openings 57 and 58 in the distributor plate 56. It is noted the as shown the openings 57 and 58 are not in radial alinement and, therefore, the seeds will be ejected from the chutes 48 and 49 alternately. However, it would be possible to locate two or three of the openings 58 in between each opening 57 whereby there would be three ejections from the chute 48 to every ejection from the chute 49. Therefore, it is clearly within the scope of the invention to drop the seeds from the chutes 48 and 49 in any desired order merely by locating the outlet openings 57 and 58 in the plate 56 in any desired order.

It is noted that when the hopper is in its lowermost position the bell crank 43 which serves to raise and lower said hopper is so constructed that it serves to lock said hopper in its lowered position, whereby there is no danger of the hopper jarring upwardly to disconnect the gears 67 and 68 from each other. Therefore, it is assured that the rotation of the plate 56 will occur so long as the machine or device moves forwardly.

After the seed has been planted and it is desired to move the device without operating the planting means, it is only necessary to pull the hand lever 28 rearwardly toward the position shown in dotted lines in Figure 1. This rearward swinging of the lever 28 causes the presser wheel 22 to be moved downwardly with relation to the frame through the medium of the crank 27 and curved arm 25. Upon initial movement of the hand lever, the presser wheel 22 immediately begins to move but the actuating arm 44 which controls the swinging of the bell crank 43 is not operated because the pin 46 on the lever is engaging in the elongated slot 45 in the actuating arm 44. Therefore, upon initial movement of the lever, the hopper 35 is not swung and it is only until the pin 46 reaches the end of said slot 45, that there is any movement imparted to the bell crank 43. After the bell crank 43 is swung upon continued movement of the hand lever, said bell crank will raise the hopper 35 to the position shown in dotted lines in Figure 1, whereby the gear 67 on the lower end of the shaft 59 which passes through the bottom of the hopper is raised out of engagement with the gear 68 mounted on the shaft 69 which is carried by the frame 10. Therefore, when the hopper is raised the connection between the gear 67 and 68 is broken and a movement of the device will not impart a rotation to the distributor plate 56.

When the presser wheel 22 has been lowered a sufficient distance, it will raise the rear end of the frame 10, said frame swinging on the shaft 13 at its forward end, whereby the entire blade assembly will be lifted from the ground. At this time the device may then be moved forwardly without the seed planting mechanism operating or without the blades 15 or 20 engaging the ground.

As has already been noted, the invention is not to be limited to any particular type of distributing plate as the particular construction of the plate depends entirely upon the seed to be planted. Various types of distributing plates may be used dependent upon the type of seed which is to be planted. The operation of the planting mechanism, however, is the same in all cases, that is, the distributing plate, no matter what its structure may be, is rotatable while the cover plate 50 is stationary, as is the bottom 36 of the hopper.

What I claim and desire to secure by Letters Patent is:

1. A planting device including, a frame, a blade carried by said frame for opening a furrow, scraper blades attached to the frame and positioned behind the first-named blade to close the furrow, a hopper supported on the frame for receiving two species of seed, means engaging said hopper for actuating the hopper and causing it to deposit seed, means for depositing seed behind the furrow-opening blade and forwardly of the scraper blades whereby said seed is dropped into the open furrow and covered by the action of said scraper blades, means for depositing a second species of seed behind the scraper blades whereby the latter seed is planted on top of the closed furrow, a scraper bar and a presser wheel carried by the frame behind the scraper blades for covering the last-mentioned seed, and a single means for swinging the pressure wheel downwardly so as to lift the furrow-opening blade and the scraper blades out of contact with the ground and at the same time disengaging the hopper from the actuating means thereby causing the hopper to cease depositing seed.

2. A planting device including, a frame, a blade carried by said frame for opening a furrow, scraper blades attached to the frame and positioned behind the first-named blade to close the furrow, a traction wheel mounted upon the frame so as to support one end of said frame, a presser wheel mounted upon the frame so as to support the other end thereof, a scraper bar mounted behind the presser wheel, a hopper mounted upon the frame, said hopper being adapted to receive and discharge two species of seed, means connected to one of said wheels and engaging the hopper for actuating the latter to cause it to discharge seed, means for depositing one species of seed behind the furrow-opening blade and forwardly of the scraper blades whereby said seed is dropped into the open furrow and covered by the action of said scraper blades, means for depositing seed behind the scraper blades whereby the latter seed is planted on top of the closed furrow being pressed into the ground by the presser wheel and covered by the action of the scraper bar, and a single means for swinging the presser wheel downwardly so as to lift the furrow-opening blade and the scraper blades out of contact with the ground and at the same time disengaging the hopper from the actuating means so as to cause said hopper to cease discharging seed, said means being operative to hold the hopper in engagement with the actuating means during normal operation of the device.

WILLIAM E. DEAN.